(12) United States Patent
Park

(10) Patent No.: US 8,235,571 B2
(45) Date of Patent: Aug. 7, 2012

(54) BACKLIGHT UNIT OF LIQUID CRYSTAL DISPLAY DEVICE AND LIQUID CRYSTAL DISPLAY DEVICE USING THE SAME

(75) Inventor: Hee Jeong Park, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 206 days.

(21) Appl. No.: 11/159,276

(22) Filed: Jun. 23, 2005

(65) Prior Publication Data

US 2006/0002151 A1    Jan. 5, 2006

(30) Foreign Application Priority Data

Jun. 30, 2004   (KR) ................. 10-2004-0049977

(51) Int. Cl.
*F21V 8/00*   (2006.01)

(52) U.S. Cl. ................ 362/555; 362/97.3; 362/561

(58) Field of Classification Search ......... 362/555, 362/558, 561, 631, 97.3; 257/81, 95; 439/62, 439/64, 69; 313/498
See application file for complete search history.

(56) References Cited

U.S. PATENT DOCUMENTS

| | | | | |
|---|---|---|---|---|
| 3,881,809 A | * | 5/1975 | Fergason et al. | 349/113 |
| 5,140,220 A | * | 8/1992 | Hasegawa | 313/512 |
| 5,375,043 A | * | 12/1994 | Tokunaga | 362/601 |
| 6,245,259 B1 | * | 6/2001 | Hohn et al. | 252/301.36 |
| 6,404,131 B1 | * | 6/2002 | Kawano et al. | 315/82 |
| 6,404,469 B1 | * | 6/2002 | Kitagawa et al. | 349/96 |
| 6,871,982 B2 | * | 3/2005 | Holman et al. | 362/331 |
| 6,969,189 B2 | * | 11/2005 | Lee et al. | 362/631 |
| 2002/0071288 A1 | * | 6/2002 | Lim | 362/558 |
| 2005/0199887 A1 | * | 9/2005 | Suehiro et al. | 257/79 |

FOREIGN PATENT DOCUMENTS

| | | | |
|---|---|---|---|
| JP | 03-208087 | | 9/1991 |
| JP | 10-104620 | | 4/1998 |
| JP | 2000-004050 | | 1/2000 |
| JP | 2000-298276 | | 10/2000 |
| JP | 2002-141557 | | 5/2002 |
| JP | 2002-208305 | | 7/2002 |
| KR | 2002018389 A | * | 3/2002 |
| KR | 20030081971 | | 10/2003 |

* cited by examiner

*Primary Examiner* — Sharon Payne
(74) *Attorney, Agent, or Firm* — McKenna, Long, and Aldridge, LLP.

(57) ABSTRACT

A direct-type backlight unit having a plurality of light emitting diodes and a liquid crystal display device having the same are disclosed. The backlight unit includes a printed circuit board (PCB); a plurality of light emitting diodes (LEDs) formed on the PCB for emitting light; and a light diffusion unit included in each of the LEDs for diffusing light.

3 Claims, 4 Drawing Sheets

BACKLIGHT UNIT OF LIQUID CRYSTAL DISPLAY DEVICE AND LIQUID CRYSTAL DISPLAY DEVICE USING THE SAME

This application claims the benefit of Korean Patent Application No. 2004-49977, filed on Jun. 30, 2004, which is hereby incorporated by reference for all purposes as if fully set forth herein.

BACKGROUND OF THE INVENTION

1. Field of the Invention

The present invention relates to a liquid crystal display device, and more particularly, to a direct-type backlight unit including a plurality of light emitting diodes and a liquid crystal display device having the same.

2. Discussion of the Related Art

Cathode ray tubes (CRTs) are one of the commonly used display devices. The CRTs have been used for monitors of various electric devices such as televisions (TVs), meters, computers and intelligent terminals. Recently, these electronic devices have become lighter and thinner to satisfy users demand. However, there is limitation in reducing the size and weight of these electronic devices due to the size and weight of the CRTs.

To overcome such a limitation, several types of display devices have been introduced such as liquid crystal display (LCD) devices that display images using an electro-optical effect, plasma display panels (PDPs) that display images using a gas discharge, and electro-luminescence display (ELDs) that display images using an electro-luminescence effect. Among these display devices, LCD devices have been most actively studied and developed. LCD devices are now widely used for monitors of laptop computers, desktop computers and information display devices.

In general, a liquid crystal display (LCD) device displays images by controlling an amount of light emitted from an external light source. Therefore, the LCD device requires an additional light source such as a backlight unit for emitting light to a liquid crystal panel. The backlight unit generally includes a plurality of cylindrical light emitting lamps and is classified into two types: the edge-type backlight unit and the direct-type backlight unit.

In a dual-edge-type backlight unit, a lamp unit is arranged at one edge of a light guide panel. The lamp unit includes a lamp for emitting light, a lamp holder formed at each end of the lamp for protecting the lamp and a lamp reflector plate for reflecting light emitted from the lamp toward the light guide panel. The lamp reflector plate covers an outer periphery of the lamp and one side of the lamp reflector plate is connected to a side edge of the light guide panel. Such an edge-type backlight unit is commonly used in small-size LCD devices such as monitors of laptop or desktop computers.

The direct-type backlight unit has been developed for large-size display devices (i.e., greater than twenty inches). In the direct-type backlight unit, a plurality of lamps are arranged in a row and a diffusion plate is arranged on the plurality of lamps. The lamps emit light directly to the entire surface of the liquid crystal panel. Since the direct-type backlight unit efficiently uses the light emitted from the lamps compared to the edge-type backlight unit, it is mainly used in large-size LCD devices such as large-size monitors or televisions (TVs) which require a high luminance. Compared with a backlight unit for small-size LCD devices, the direct-type backlight unit for large-size LCD devices is more susceptible to short lifetime or breakdown of the lamps and uses a larger number of lamps.

In case of the edge-type backlight unit where the lamp unit is arranged at both ends of the light guide panel, even when one of the lamps breaks down, the LCD device can display images without a major problem, although the luminance of the LCD device is degraded. However, in case of the direct-type backlight unit where a plurality of lamps are arranged under the liquid crystal panel, when one of the lamps breaks down, the display area corresponding to the malfunction lamp becomes noticeably darkened. Accordingly, the lamps of the LCD device using the direct-type backlight unit should be frequently replaced with new lamps. Thus, it should be easy to assemble and disassemble the LCD device having the direct-type backlight unit. The edge-type and direct-type backlight units suffer from low efficiency of light usage caused by assembling and disassembling the lamps and heat generated from the lamps.

Hereinafter, a backlight unit according to the related art will be explained with reference to the accompanying drawings. FIG. 1 is a perspective view of a direct-type backlight unit according to the related art.

Referring to FIG. 1, the backlight unit includes a plurality of light emitting lamps 1, an outer case 3 for supporting and fixing the light emitting lamps 1 and a light diffusion unit 5a, 5b, 5c arranged between the light emitting lamps 1 and a liquid crystal panel (not shown).

The light diffusion units 5a, 5b, 5c provide a uniform luminance to the liquid crystal panel and prevent a shape of the light emitting lamps from being shown on a display side of the liquid crystal panel. Accordingly, a plurality of diffusion sheets and diffusion plates may be provided between the liquid crystal panel and the backlight unit in order to improve light diffusion efficiency.

A reflector plate 7 is arranged inside the outer case 3 for focusing the light emitted from the light emitting lamps 1 to the display side of the liquid crystal panel. That is, the reflector plate 7 maximizes the efficiency of light usage.

Cold cathode fluorescent lamps (CCFL) are used as the light emitting lamps 1. The light emitting lamp 1 includes two electrodes at each end of the tube. When electric power is supplied to the electrodes, the light emitting lamp 1 emits light. The light emitting lamp 1 is placed in a groove formed on both sides of the outer case 3. The electrodes of the light emitting lamp 1 are connected to power input lines 9a, 9b to supply electric power to the light emitting lamp and the power input lines 9a, 9b are connected to an additional connector connected to an operating circuit. Accordingly, an additional connector is required for each light emitting lamp 1. That is, the power input lines 9a, 9b connected to the electrodes are connected to a single connector and one of power input lines 9a, 9b is bent under the outer case 3 and connected to the connector.

External electrode fluorescent lamps (EEFL) may be used as the light emitting lamps instead of using the CCFL. The EEFL includes electrodes located outside each end of the tube.

The direct-type backlight unit according to the related art has the following problems. First, heat generated from the light emitting lamps is directly transferred to a LCD module including the LCD panel because the light emitting lamps are included inside the LCD module as a light source. Accordingly, the LCD device including the direct-type backlight unit generates a comparatively large amount of heat that degrades the performance, especially when the LCD device is used in such environments as vehicles or military environments. Second, because the direct-type backlight unit includes a plurality of light emitting lamps, especially when it is employed for large-size display devices, the LCD device including the direct-type backlight unit consumes a large amount of power. Third, when the direct-type backlight unit includes a gas such as mercury (Hg), it suffers from low durability and may also create an environmental problem.

Hereinafter, a direct-type backlight unit having a plurality of light emitting diodes (LEDs) according to the related art will be described. The direct-type backlight unit having LEDs may be called a LED-direct-type backlight unit. FIG. 2 is a perspective view illustrating a direct-type backlight unit having a plurality of light emitting diodes (LEDs) according to the related art.

Referring to FIG. 2, the LED-direct-type backlight unit includes a printed circuit board (PCB) 42, a plurality of light emitting diodes (LEDs) 44 formed on the PCB 42 for emitting light, and a diffusion plate 46 for uniformly diffusing the light emitted from the LEDs 44.

Each of the LEDs 44 includes a lens formed of a plastic material. The lens is transparent and does not include a pattern for diffusing light. Each of the LEDs 44 is a point light source and emits a red light, a green light or a blue light. A circuit for controlling the LEDs 44 is formed on the PCB 42. The PCB 42 also supports the LEDs 44 and controls the LEDs 44 using the circuit formed on the PCB 42.

A reflector plate is formed over the lens of the LEDs 44 for diffusing the light emitted from the LEDs 44 in a lateral direction. Accordingly, red, green and blue lights are mixed inside a bottom cover (not shown) and thus a white light is generated and directed toward a liquid crystal panel (not shown). The diffusion plate 46 is provided within a predetermined space for diffusing the white light emitted from the LEDs 44 (uniform distribution).

FIG. 3 is a schematic diagram illustrating a LED lamp unit of the LED-direct-type backlight unit illustrated in FIG. 2. Referring to FIG. 3, lighting emitting diodes (LED) emitting a red light R, a green light G and a blue light B are arranged in order to display the corresponding colors. The LEDs may be turned on frame by frame or all LEDs may be simultaneously turned on for generating a white light which is then directed toward the liquid crystal panel.

Although the LED-direct-type backlight unit includes the diffusion plate 46 over the lens of the LEDs 44, about 10% of the light is not mixed and propagates in a vertical direction, thereby generating a red, green or blue spot on the LCD screen. Such a spot degrades the quality of the images displayed on the LCD screen. Thus, the backlight unit and the liquid crystal panel should be separated by a predetermined space, thereby increasing the size of the LCD device.

SUMMARY OF THE INVENTION

Accordingly, the present invention is directed to a backlight unit of a liquid crystal display device and a liquid crystal display device having the same that substantially obviates one or more problems due to limitations and disadvantages of the related art.

An advantage of the present invention is to provide a backlight unit of a liquid crystal display device and a liquid crystal display device having the same for improving luminance uniformity and reducing a thickness of the backlight unit.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a backlight unit of a display device includes a printed circuit board (PCB); a plurality of light emitting diodes (LEDs) formed on the PCB for emitting light; and a light diffusion unit included in each of the LEDs for diffusing light.

In another aspect of the present invention, a liquid crystal display device includes a liquid crystal panel; a printed circuit board (PCB); and a plurality of light emitting diodes (LEDs) on the PCB, each of the LEDs including a light diffusion unit for diffusing light.

In yet another aspect of the present invention, a display device includes a display panel and a backlight unit, the backlight unit including a printed circuit board (PCB), a plurality of light emitting diodes (LED) on the PCB and a lens on each of the LEDs, wherein a diffusion pattern is formed on a surface of the lens.

In still another aspect of the present invention, a method of fabricating a backlight unit for a display device includes preparing a light emitting diode; forming a lens having a light diffusion unit on the light emitting diode; and mounting the light emitting diode on a substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

A liquid crystal display (LCD) device having a LED-direct-type backlight unit according to the present invention includes a fine pattern formed on a lens of each LED. Such fine patterns on the lens of the LEDs minimize or prevent light from propagating vertically toward the LCD panel and thus the diffusion efficiency of the backlight unit increases compared with the LED-direct-type backlight unit of the related art.

Figure 1:
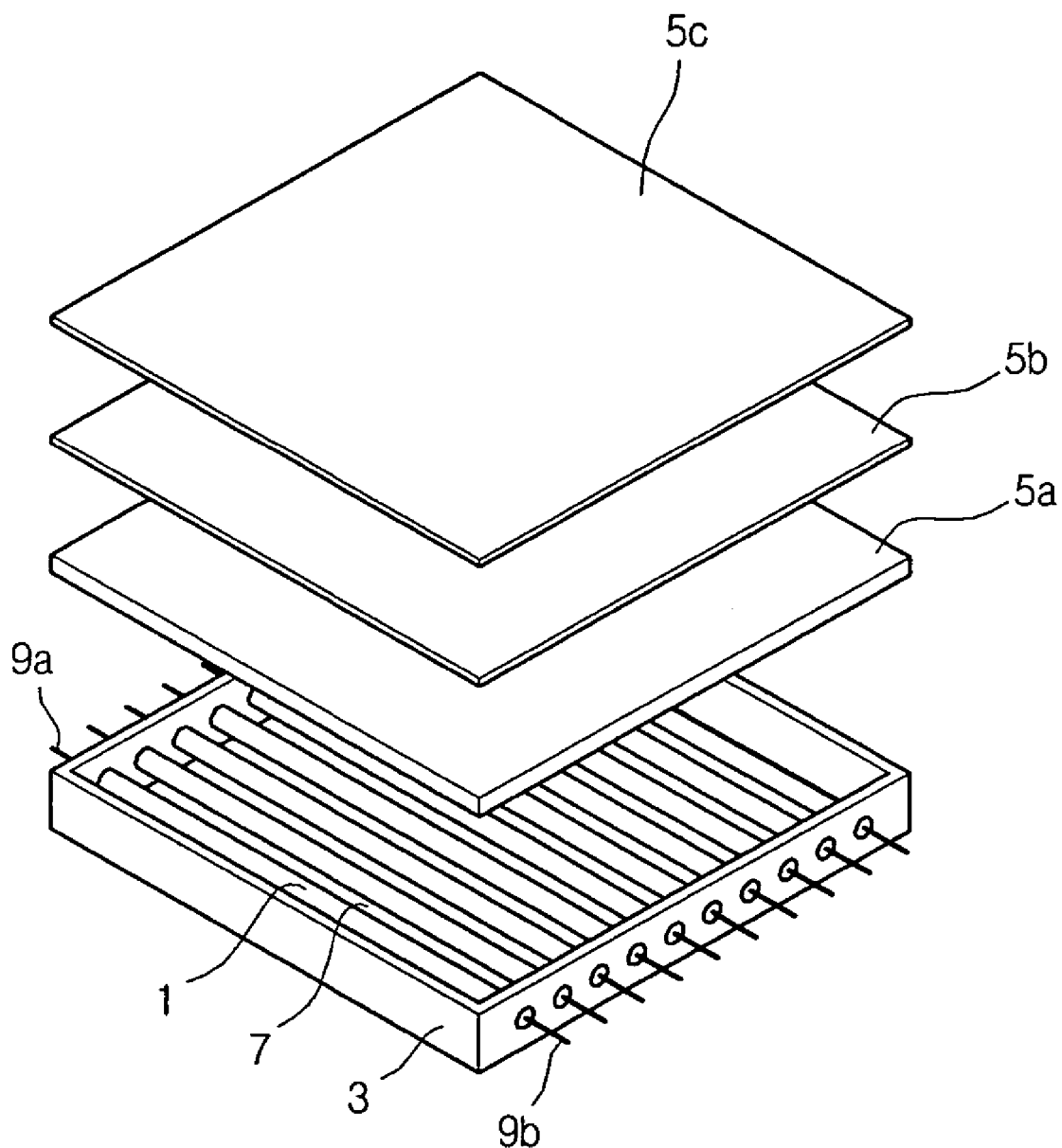
FIG. 1 is a perspective view of a direct-type backlight unit in accordance with the related art.
Figure 2:
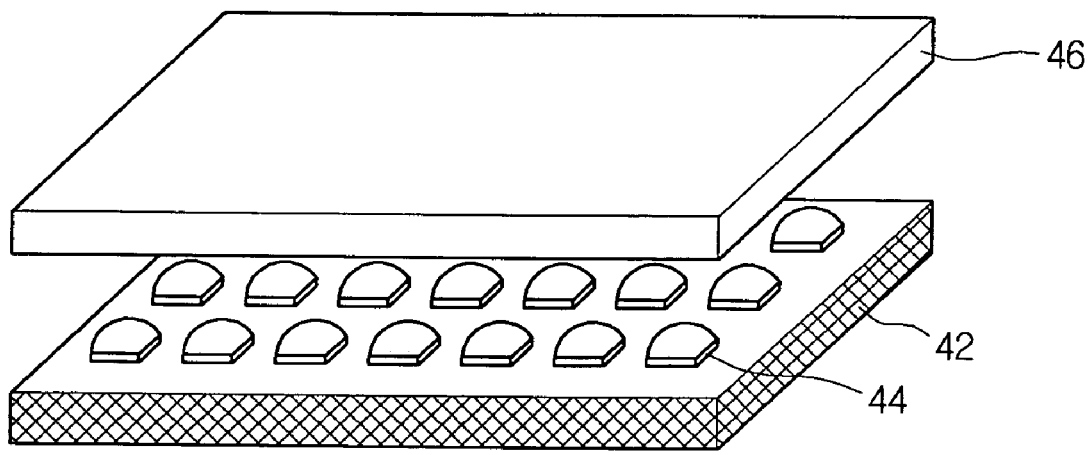
FIG. 2 is a perspective view illustrating a direct-type backlight unit having a plurality of light emitting diodes (LEDs) according to the related art.
Figure 3:
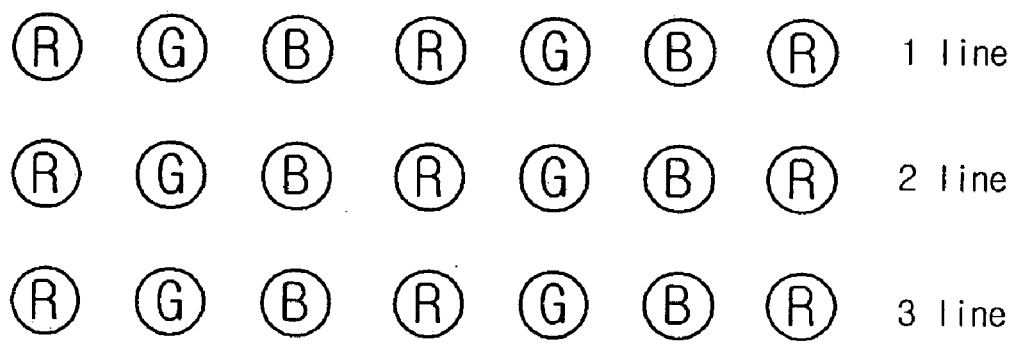
FIG. 3 is a schematic diagram illustrating a LED lamp unit of the LED-direct-type backlight unit illustrated in FIG. 2.
Figure 4A:
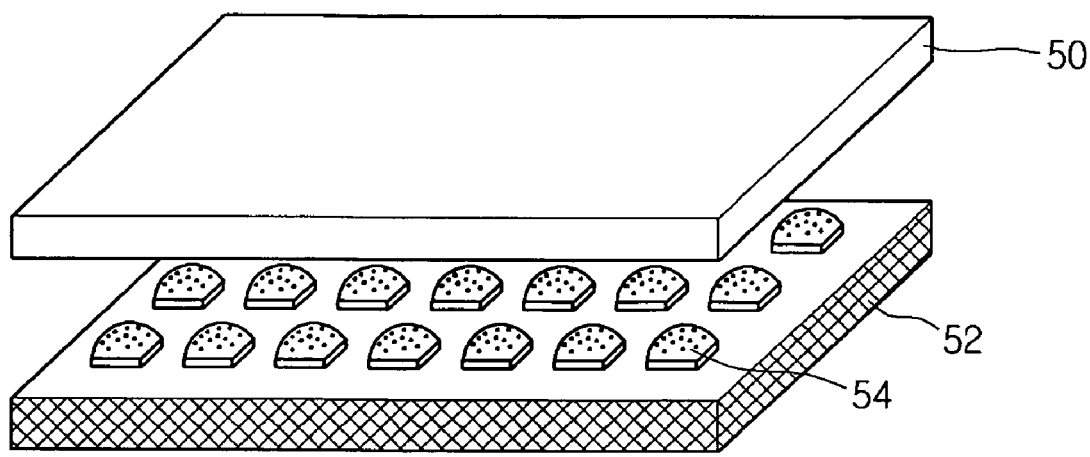
FIG. 4A is a schematic view illustrating a LED backlight unit in accordance with an embodiment of the present invention.
Figure 4B:
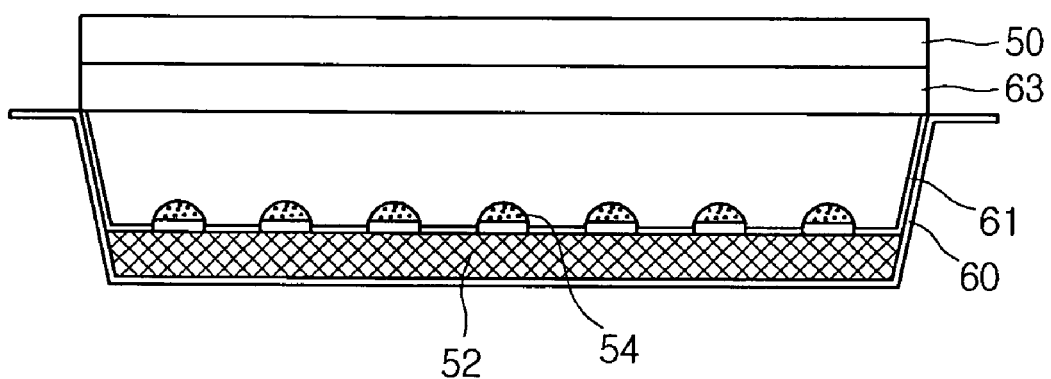
FIG. 4B is a cross sectional view of a liquid crystal display device including a LED backlight unit in accordance with an embodiment of the present invention.

FIG. 4A is a schematic view illustrating a LED backlight unit in accordance with an embodiment of the present invention and FIG. 4B is a cross-sectional view of a liquid crystal display device including a LED backlight unit in accordance with an embodiment of the present invention.

Referring to FIG. 4A, the liquid crystal display (LCD) device includes a backlight unit and a liquid crystal display (LCD) panel 50. The backlight unit includes a printed circuit board (PCB) 52 and a plurality of light emitting diodes (LED) 54 formed on the PCB 52. Each of the LEDs 54 is a point light source and emits a red light, a green light or a blue light. A circuit for controlling the LEDs 54 is formed on the PCB 52. The PCB 52 supports the LEDs 54 and controls the LEDs 54 using the circuit formed on the PCB 52.

Referring to FIG. 4B, the LEDs 54 and the PCB 52, which are part of the backlight unit of the present invention, are mounted on a bottom cover 60. A diffusion plate 63 and a liquid crystal panel 50 are arranged on the backlight unit.

A fine pattern or a metal plate is formed on a lens of each LED 54 to minimize or prevent light from propagating vertically toward the LCD panel 50. The fine pattern increases the diffusion efficiency and the metal pattern intercepts the light. The fine pattern is formed by mixing diffusion particles with an adhesive and a pigment and coating the mixed diffusion particles on a surface of the LED lens. The metal plate is formed by coating a metal material for completely intercepting the light vertically transmitted to the LCD panel 50. Forming the fine pattern and the metal plate will be explained in detail with reference to FIGS. 5 and 6.

Figure 5:
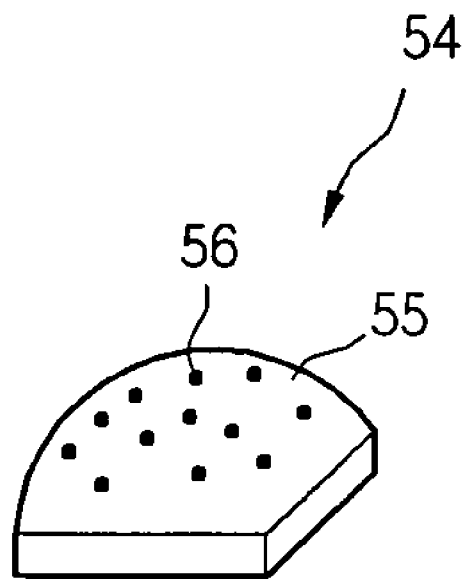
FIG. 5 is a perspective view illustrating a surface of a LED lens illustrated in FIG. 4A.

As illustrated in FIG. 5, a fine pattern 56 is formed on a surface 55 of a lens of the LED 54 for diffusing the light emitted from the LED 54. As disclosed above, the fine pattern 56 is formed by mixing diffusion particles with an adhesive and a pigment. By changing a density of the diffusion particles, the light diffusivity of the fine pattern 56 can be adjusted. As a result of the fine pattern 56, the LED-direct-type backlight unit according to the present invention can improve the image quality displayed on the screen by minimizing or preventing the aforementioned spots.

According to the principles of the present invention, the size of the space required between the backlight unit and the LCD panel 50 is inversely proportional to the density of the fine pattern 56 formed on the lens surface 55.

Figure 6:
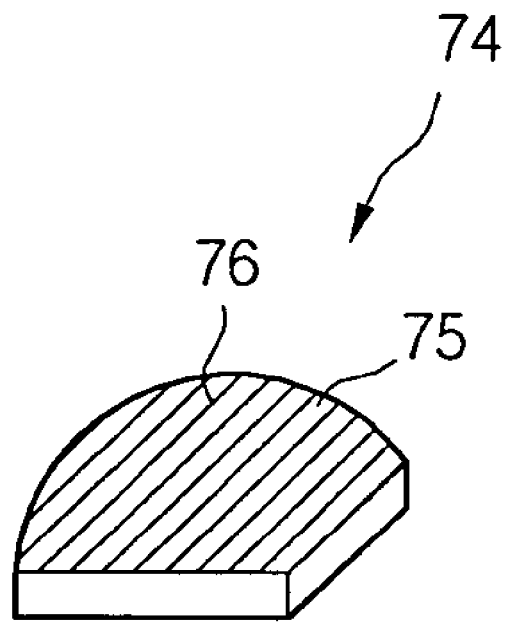
FIG. 6 is a perspective view illustrating a surface of a LED lens in accordance with another embodiment of the present invention.

FIG. 6 illustrates a surface of a LED lens including a metal plate 76 in accordance with another embodiment of the present invention. The metal plate 76 is formed on the lens surface 75 of the LED 74 for completely intercepting the light vertically transmitted to the LCD panel 50. As a result of the metal plate 76, the light emitted from the LED 74 propagates only in a lateral direction and generates a white light after being mixed with the light emitted form adjacent LEDs. Therefore, white light can be generated more efficiently.

Furthermore, because the density of the lens surface 75 is so high that the backlight unit can be mounted to the liquid crystal panel with a very small space. Therefore, a completed LCD device can have a small thickness.

According to the principles of the present invention, a diffusion sheet (not shown) having the identical pattern as the fine pattern 56 may be attached on the lens surface 55 for diffusing the light emitted from the LED 54, instead of directly forming such a fine pattern on the lens surface 55. That is, a fine pattern is formed on a transparent diffusion sheet such as a plastic plate and then attached on the lens surface 55.

A LED-direct-type LCD device of the related art includes a diffusion sheet between the backlight unit and the LCD panel. However, in the present invention, the fine pattern 56 on the lens surface 55 can replace the diffusion sheet.

As disclosed above, an LCD device having a LED-direct-type backlight unit according to the present invention can improve the quality of the images displayed on the LCD screen and can be manufactured in a small size by forming the fine pattern or the metal plate on the LED lens surface.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device, comprising:
a liquid crystal panel;
a printed circuit board (PCB);
a plurality of light emitting diodes (LEDs) on the PCB; and
a plurality of fine patterns directly formed on an entire upper portion of each LED for diffusing light,
wherein the upper portion has a semi-sphere shape,
wherein each fine pattern has a dot shape,
wherein each fine pattern is a mixture of a light diffusion material, a pigment and an adhesive, and
wherein the fine patterns expose a part of the convex surface of the lens of each LED.

2. A display device, comprising:
a display panel and a backlight unit, the backlight unit including a printed circuit board (PCB), a plurality of light emitting diodes (LED) on the PCB and a lens on each of the LEDs,
wherein a diffusion pattern is directly formed on an entire upper portion of each LED for diffusing light,
wherein the diffusion pattern includes a plurality of fine patterns directly formed on the entire upper portion,
wherein the upper portion has a semi-sphere shape,
wherein each fine pattern has a dot shape,
wherein each fine pattern is a mixture of a light diffusion material, a pigment and an adhesive,
wherein the diffusion pattern expose a part of the convex surface of the lens.

3. The display device according to claim 2, wherein the diffusion pattern is on a transparent sheet and is attached on the surface of the lens.

* * * * *